UNITED STATES PATENT OFFICE.

PERCY PARRISH, OF LONDON, AND WILLIAM ARGENTINE McINTOSH VALON, OF STAFFORD, ENGLAND, ASSIGNORS TO THEMSELVES AND SOUTH METROPOLITAN GAS COMPANY, OF LONDON, ENGLAND.

MANUFACTURE OF NEUTRAL SULFATE OF AMMONIA.

1,360,785.   Specification of Letters Patent.   Patented Nov. 30, 1920.

No Drawing.   Application filed August 11, 1919.   Serial No. 316,763.

*To all whom it may concern:*

Be it known that we, PERCY PARRISH and WILLIAM ARGENTINE McINTOSH VALON, both subjects of the King of Great Britain, residing, respectively, in London, England, and Stafford, England, have jointly invented certain new and useful Improvements in the Manufacture of Neutral Sulfate of Ammonia, of which the following is a specification.

A known method of neutralizing the acid which remains in sulfate of ammonia as usually made, consists in condensing the vapors from the fixed ammonia still, diluting the condensate with water until it is of suitable strength and spraying the crystals of sulfate of ammonia with the dilute liquid.

It is the object of the present invention to obtain for diluting the aforesaid condensate, an agent which is free from the lime salts present in ordinary water, without incurring the cost of a separate distillation.

For this purpose there is used a condensate obtained from the hot waste liquor from the fixed ammonia still.

It is impracticable in the fixed ammonia still to expel all the ammonia; we have found that by subjecting the hot waste liquor from the still to a slightly reduced pressure, steam containing a considerable fraction of the ammonia left in the liquor can be withdrawn and condensed to a weak ammoniacal liquid suitable as the diluent in question, particularly if condensed at a temperature appropriate to that at which the vapors from the fixed ammonia still have been condensed.

As an example there may be cited the application of the invention when it is desired to neutralize crystals the temperature of which is about 75° C. by the time the mother liquor has drained from them. In this case the temperature of the ammonia solution used for washing should preferably be between 60° and 70° C. and its strength about 0.5 per cent. $NH_3$. Such a solution may conveniently be obtained by condensing the vapor from the ammonia still at 60°–70° C. and diluting the condensate with water at this temperature to lower its strength to that stated. Preferably, however, for obtaining the requisite diluent an ejector is connected through a condenser with the upper part of a tank through which the waste liquor from the ammonia still runs away; the pressure in the bottom of the still being some 8 inches of mercury above atmospheric pressure, that in the tank should be 4–8 inches below atmospheric pressure; such a condition causes the condensation in the condenser of a solution of ammonia of about 0.25 per cent. strength.

Having thus described the nature of the said invention and the best means we know of carrying the same into practical effect, we claim:—

A process for neutralizing sulfate of ammonia crystals which consists in condensing the vapors from a fixed ammonia still, condensing vapor withdrawn under reduced pressure from the waste liquor from the fixed ammonia still, mixing the two condensates so as to obtain a liquor having the correct content of ammonia and then spraying the crystals with the said liquor.

In testimony whereof we have signed our names to this specification.

PERCY PARRISH.
WILLIAM ARGENTINE McINTOSH VALON.